United States Patent Office 3,331,339
Patented July 18, 1967

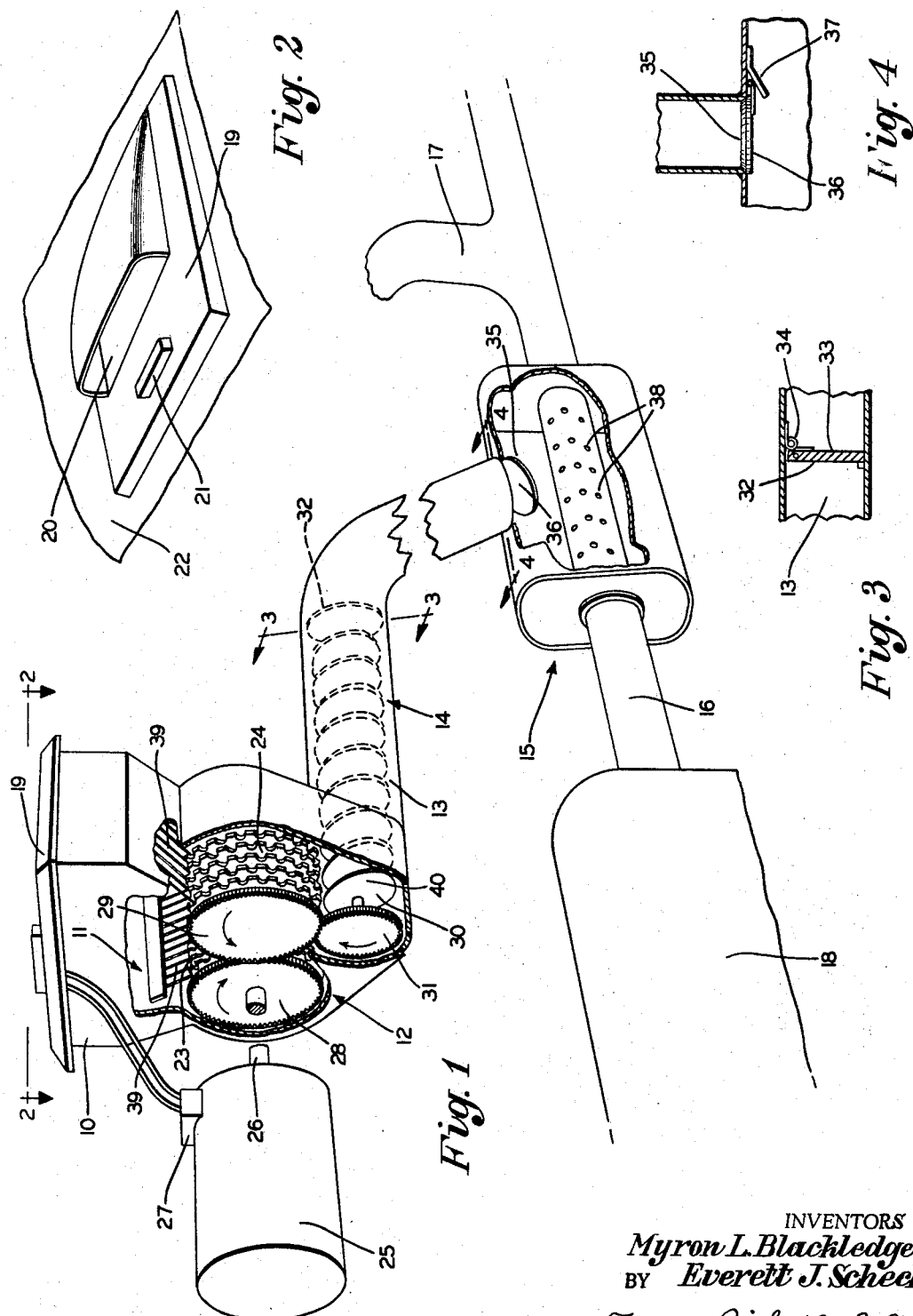

3,331,339
POWER ASH TRAY CONSTRUCTION
Myron L. Blackledge, 88 Moffet Road, Lucas, Ohio 44843, and Everett J. Scheck, R.R. 2, Box 120, Danville, Ohio 43014
Filed Feb. 3, 1966, Ser. No. 524,755
6 Claims. (Cl. 110—18)

Our invention relates to improvements in power ash trays, and more specifically, to power ash trays constructed particularly for installation in motor vehicles, such as automobiles, trucks and the like.

It has become an ever increasing problem in modern society for the various political subdivisions to maintain the highways in a clean and respectable condition as the result of various debris, such as cigarettes, being disposed along the highways from moving motor vehicles. This is particularly critical in the case of burning cigarettes and cigars wherein disposal along the highways can cause serious damage as the result of fires.

It is, therefore, a general object of the present invention to provide a power ash tray construction into which lighted cigarettes, cigars and other small debris may be deposited and the material thusly deposited will be first ground up into a finely comminuted form with any burning being extinguished, the comminuted material then conveyed to a waste chamber surrounding the motor vehicle exhaust pipe, the comminuted material burned from the heat of the exhaust pipe within the waste chamber to a finely powdered form, and the powdered form automatically disposed into the atmosphere with the exhaust of the motor vehicle from the exhaust pipe.

These and other objects are accomplished by the parts, constructions, arrangements, combinations and subcombinations comprising the present invention, a preferred embodiment of which—illustrative of the best mode in which applicants have contemplated applying the principles—is set forth in the following description and illustrated in the accompanying drawings, and which is particularly and distinctly pointed out and set forth in the appended claims forming a part hereof.

In general terms, the power ash tray construction of the present invention may be stated as including a hopper for mounting beneath the instrument panel of a motor vehicle, grinder means communicating with the hopper for receiving and grinding debris to a comminuted state, conveyor means preferably in the form of an auger screw mounted in communication with the grinder means for receiving the comminuted debris and transporting such debris to a waste chamber mounted surrounding the exhaust pipe of the motor vehicle, and the exhaust pipe of the motor vehicle being formed with perforations for receiving debris therethrough into the exhaust pipe which has been burned in the waste chamber as a result of heat from the exhaust pipe and the hot gases therein.

More specifically, the grinding means may be driven by motor means operably connected through a timer switch, so that the timer switch may be actuated to begin operation of the grinder means for a timed period, during which, the debris in the hopper will be ground to a comminuted state. Furthermore, pivot valve means may be provided between the waste chamber and conveyor means automatically closed by the manifold pressure in the exhaust pipe for preventing the normal exhaust of the motor vehicle from passing reversely through the power ash tray construction, with this valve means automatcally opening to deposit comminuted debris into the waste chamber when the motor vehicle is not operating and the manifold is free of pressure. Finally, spring valve means may also be provided at the exit end of the auger screw forming the conveyor means, which valve means remains normally closed and is opened against spring pressure by comminuted debris exiting from the auger screw.

By way of example, an embodiment of the improved power ash tray construction comprising the present invention is illustrated in the accompanying drawings forming a part hereof, wherein like numerals indicate similar parts throughout the several views, and in which:

FIG. 1 is a fragmentary side perspective view, with parts broken away and parts in section, showing the over-all assembly of the power ash tray construction of the present invention;

FIG. 2, an enlarged fragmentary top perspective view looking in the direction of the arrows 2—2 in FIG. 1;

FIG. 3, a fragmentary sectional view, part in elevation, looking in the direction of the arrows 3—3 in FIG. 1; and FIG. 4, a fragmentary sectional view looking in the direction of the arrows 4—4 in FIG. 1.

Referring to the drawings, the power ash tray construction of tthe present invention includes a main case 10 enclosing a hopper generally indicated at 11 and grinder means generally indicated at 12, a waste tube 13 enclosing conveyor means generally indicated at 14 and a waste chamber generally indicated at 15 surrounding the exhaust pipe 16 of a motor vehicle between the engine manifold 17 and the muffler 18.

As shown particularly in FIGS. 1 and 2, the main case 10 is provided with the top cover 19 having the receiving slot 20 and the timer switch bar 21. This top cover 19, as shown in FIG. 2, may be mounted extending through the horizontal surface of the motor vehicle instrument panel 22 with the remainder of the main case 10 extending downwardly therefrom and behind the major portion of the instrument panel (not shown).

The hopper 11 is formed at the upper part of the main case 10, being generally rectangular in configuration and being upwardly in communication with the receiving slot 20 of top cover 19 and downwardly in communication with the grinder means 12. The grinder means 12 is formed by two opposed and intermeshed grinding rolls 23 and 24, each of which is rotatably mounted in the lower portion of the main case 10 in the usual manner.

The grinding roll 23 is operably connected to an electric drive motor 25 through the drive shaft 26, and the drive motor 25 is controlled for operation by a timer switch 27, which timer switch is, in turn, controlled by the timer switch bar 21 on the main case top cover 19 previously referred to. This grinding roll 23 is also provided at the front face thereof with a gear 28, which gear is operably engaged with a similar gear 29 on the front face of the other grinding roll 24.

The waste tube 13 is mounted extending horizontally rearwardly from the extreme lower portion of the main case 10 in communication with the main case, and then this waste tube 13 angles downwardly into connection and communication with the waste chamber 15.

Conveyor means 14 is in the form of an auger screw 30 rotatably mounted in the usual manner within the horizontal portion of the waste tube 13 and extending forwardly into the extreme lower portion of main case 10 directly beneath the grinding rolls 23 and 24 of grinder means 12.

This auger screw 30 is formed at the front face thereof with a gear 31 operably engaged with the gear 29 of grinding roll 24. Furthermore, at the rearward end of the auger screw 30 is mounted a normally closed spring valve 32, normally closing the waste tube 13, with spring valve 32 having the pivoted valve plate 33 spring urged forwardly to a closed position by the spring 34, as shown in FIG. 3.

The waste chamber 15 is merely formed as a closed rectangular box and is secured surrounding the exhaust pipe 16 of the motor vehicle. As before stated, the downwardly angled end of the waste tube 13 is connected into this waste chamber 15 in communication therewith.

This lower end of the waste tube 13 at the waste chamber 15 is normally open, but closable by a pressure valve 35 formed by the pivotally mounted valve plate 36 and the plate stop 37, as shown in FIG. 4. As shown in FIG. 1, the valve plate 36 of pressure valve 35 will normally drop open by gravity to the open position shown and against the plate stop 37 when there is no pressure in the waste chamber 15, but a buildup of pressure in the waste chamber will force valve plate 36 to its closed position shown in FIG. 4, substantially sealing off the lower end of the waste tube 13.

The portion of the exhaust pipe 16 of the motor vehicle passing through the waste chamber 15 is provided with a series of perforations 38, thereby providing a communication between the waste chamber 15 and the interior of exhaust pipe 16. As shown in FIG. 1 and previously pointed out, it is preferred to secure the waste chamber 15 surrounding the exhaust pipe 16 between the engine manifold 17 and muffler 18 of the motor vehicle.

Thus, in operation of the power ash tray construction of the present invention, debris, say a lighted cigarette, may be deposited in the receiving slot 20 of the main case top cover 19, and will drop downwardly through hopper 11 and between the grinding rolls 23 and 24 of grinder means 12. The timer switch bar 21 on the main case top cover 19 may then be depressed to actuate the timer switch 27 for operating the drive motor 25 for a timed period.

Operation of the drive motor 25 rotates the grinding roll 23 clockwise, and at the same time, rotates the gear 28 at the front face of this grinding roll in the same direction. Rotation of gear 28 on grinding roll 23 in the clockwise direction, in turn, rotates gear 29 and thereby grinding roll 24 in a counterclockwise direction.

Rotating grinding rolls 23 and 24 in the opposed directions will grind up and extinguish the burning cigarettes received from hopper 11 and dispose the final comminuted debris therefrom onto the forward end of the auger screw 30 forming a part of the conveyor means 14. Also, as shown in FIG. 1, a series of spring fingers 39 may be mounted on the main case 10 engaged with the grinding rolls 23 and 24 so as to prevent material received from hopper 11 against the grinding rolls from passing between what might be considered the backsides of these rolls and the main case, and insuring that any such material must pass downwardly between the opposed grinding rolls and thereby be ground up and finely comminuted.

Since the gear 29 on grinding roll 24 is rotating in a counterclockwise direction, the gear 31 at the front face of the auger screw 30 will rotate in a clockwise direction, thereby rotating the auger screw 30 in a clockwise direction. In this manner, the finely comminuted debris received from the grinding rolls 23 and 24 onto auger screw 30 will be conveyed rearwardly through waste tube 13 to the rearward end of the auger screw and the spring valve 32 by the usual continuous screw blade 40 on this auger screw. As before stated, the valve plate 33 of spring valve 32 is normally urged to the closed position shown in FIG. 3 by the spring 34, but as the comminuted debris is conveyed or forced rearwardly through waste tube 13 by auger screw 30 and against this valve plate 33, the comminuted debris will force the valve plate open so that this debris may pass downwardly to the lower end of waste tube 13 at the waste chamber 15.

Now, if the engine of the motor vehicle is in operation, the manifold pressure within the engine manifold 17 will cause the pressure of the exhaust gases to pass through the perforations 38 in the exhaust pipe 16 within waste chamber 15, thereby maintaining the valve plate 36 of pressure valve 35 in closed position as shown in FIG. 4, so that the comminuted debris will remain at this pressure valve 35 and cannot pass into the waste chamber 15. When, however, the engine of the motor vehicle is stopped, this manifold pressure will no longer be present, so that the valve plate 36 of pressure valve 35 may move by gravity to open position as shown in FIG. 1 and deposit the comminuted debris into the waste chamber 15.

Thus, when the engine of the motor vehicle is again started causing the manifold pressure and the hot exhaust gases to pass rearwardly through the exhaust pipe 16 and through the perforations 38 into the waste chamber 15, although the pressure valve 35 has now again closed, the heat of these exhaust gases and the resulting heat of the exhaust pipe 16 and waste chamber 15 will cause the comminuted debris which was deposited in the waste chamber to be burned to a fine ash, and pass through the perforations 38 into the exhaust pipe 16 so as to be deposited into the atmosphere with the usual exhaust gases.

Obviously, after the grinding rolls 23 and 24, as well as the auger screw 30, have been driven by the drive motor 25 for the timed period determined by the timer switch 27, which is precalculated as a sufficient time for accomplishing the required grinding action, the timer switch will shut off the drive motor, thereby stopping the rotation of the grinding rolls and auger screw. The power ash tray construction of the present invention will then be in condition for the next disposal operation as desired.

Thus, according to the principles of the present invention, a power ash tray construction is provided for quickly, conveniently and safely disposing of lighted cigarettes and cigars, as well as other small debris, and such disposal will not create unsightly debris along the highways, nor create a danger of accidental and possible damaging fires.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claims.

We claim:

1. Power ash tray construction for motor vehicles including a hopper into which waste debris may be deposited, grinder means for grinding the debris into comminuted debris, a vehicle exhaust pipe, a waste chamber mounted surrounding the vehicle exhaust pipe, the exhaust pipe having perforations formed therethrough providing a communication between the exhaust pipe and the waste chamber, and conveyor means communicating with the grinder means and the waste chamber for conveying the comminuted debris from the grinder means and into the waste chamber; whereby, the motor vehicle hot exhaust gases passing through the exhaust pipe and into the waste chamber will burn the comminuted debris and transport the burned debris from the waste chamber through the exhaust pipe to the atmosphere.

2. Power ash tray construction as defined in claim 1 in which pressure valve means is mounted between the conveyor means and waste chamber for movement to closed position by the pressure of the exhaust gases in the waste chamber when the motor vehicle is in operation and for movement to open position providing communication between the conveyor means and waste chamber when the motor vehicle is not in operation and there is no exhaust gas pressure in the waste chamber.

3. Power ash tray construction as defined in claim 1 in which the conveyor means includes a rotating auger screw rotatable in a waste tube; in which the auger screw receives the comminuted debris from the grinder means at a forward end of said screw and conveys said debris to a rearward end of said screw within the waste tube; and in which spring valve means is mounted in the waste tube at the auger screw rearward end normally closing said waste tube and urged to open position by the comminuted debris conveyed from the screw rearward end.

4. Power ash tray construction as defined in claim 1 in which the grinder means includes a pair of interengaged opposed grinding rolls rotatably driven by an electric motor; and in which the operation of the electric motor is controlled by timer switch means for operating the electric motor during a predetermined timed period.

5. Power ash tray construction as defined in claim 1 in which the grinder means includes interengaged opposed first and second grinding rolls; in which the conveyor means includes a rotatable auger screw; in which an electric motor is operably connected to the first grinding roll for rotating said roll; in which the first grinding roll is operably connected to the second grinding roll for rotating said second grinding roll; and in which the auger screw is operably connected to the second grinding roll for rotating the auger screw.

6. Power ash tray construction as defined in claim 1 in which the conveyor means includes a rotating auger screw rotatable in a waste tube; in which the auger screw receives the comminuted debris from the grinder means at a forward end of said screw and conveys said debris to a rearward end of said screw within the waste tube; in which spring valve means is mounted in the waste tube at the auger screw rearward end normally closing said waste tube and urged to open position by the comminuted debris conveyed from the screw rearward end; in which the conveyor means waste tube extends from the auger screw rearward end to the waste chamber; and in which pressure valve means is mounted between the conveyor means waste tube and waste chamber at the waste chamber for movement to closed position by the pressure of the exhaust gases in the waste chamber when the motor vehicle is in operation and for movement to open position providing communication between the conveyor means waste tube and waste chamber when the motor vehicle is not in operation and there is no exhaust gas pressure in the waste chamber.

References Cited

UNITED STATES PATENTS

| | | | |
|---|---|---|---|
| 2,213,668 | 9/1940 | Dundas et al. | 110—15 |
| 2,299,668 | 10/1942 | Webster | 206—19.5 |
| 2,556,370 | 6/1951 | Holmes | 206—19.5 |
| 2,823,799 | 2/1958 | Gangell | 206—19.5 |

JAMES W. WESTHAVER, *Primary Examiner.*